United States Patent [19]

White et al.

[11] Patent Number: 5,501,281
[45] Date of Patent: Mar. 26, 1996

[54] TORQUE-RESISTANT, SEAL SETTING FORCE-LIMITED, HYDRAULICALLY SETTABLE WELL PACKER STRUCTURE AND ASSOCIATED METHODS

[75] Inventors: Pat M. White; John C. Gano, both of Carrollton, Tex.

[73] Assignee: Halliburton Company, Houston, Tex.

[21] Appl. No.: 380,901

[22] Filed: Jan. 30, 1995

Related U.S. Application Data

[63] Continuation-in-part of Ser. No. 296,941, Aug. 26, 1994.
[51] Int. Cl.$^6$ .................................................. E21B 33/128
[52] U.S. Cl. ........................................... 166/387; 166/134
[58] Field of Search ...................................... 166/387, 120, 166/134

[56] References Cited

U.S. PATENT DOCUMENTS

| | | | |
|---|---|---|---|
| 4,440,223 | 4/1984 | Akkerman | 166/134 X |
| 4,515,213 | 5/1985 | Roger et al. | 166/123 |
| 4,606,408 | 8/1986 | Zunkel et al. | 166/278 |
| 5,311,938 | 5/1994 | Hendrickson et al. | 166/134 |
| 5,322,127 | 6/1994 | McNair et al. | 166/50 X |

OTHER PUBLICATIONS

"Exploiting Reservoirs with Horizontal Wells: The Maersk Experience"; Oilfield Review; vol. 2 No. 3.
"Gravel Packing Horizontal and Highly Deviated Openhole Completion Using a Single–Screen Prepacked Liner in Offshore California Fields"; SPE 19718, 1989.

Primary Examiner—William P. Neuder
Attorney, Agent, or Firm—William M. Imwalle; David H. Hitt

[57] ABSTRACT

A torque-resistant hydraulically settable packer is coaxially positionable within a subterranean well flow conductor and has a tubular body that carries a circumferentially spaced series of radially outwardly movable slip anchors having, on outer side surfaces thereof, gripping teeth with lengths that are sloped relative to the longitudinal axis of the tubular and to a plane perpendicular. Inner side surfaces of the slip anchors are engaged by circumferentially spaced flat outer side surface areas formed on the facing frustroconical ends of an opposed pair of annular setting wedge members coaxially carried by the tubular body and being axially drivable to radially outwardly shift the slip anchors to their setting positions. As the slip anchors are being set, an annular resilient seal structure is simultaneously compressed in an axial direction against a setting force limiting member telescopingly received in one of the setting wedge members, and radially deformed outwardly into sealing engagement with the interior side surface of the well flow conductor. After the slip anchors are set, the seal structure is further compressed in an axial direction by hydraulically shifting the tubular body relative to the slip anchors. If this subsequent axial compression force exerted on the seal structure is above a predetermined maximum level the setting force member is wedgingly driven into its associated setting wedge member to limit the total axial compression force imposed on the seal structure.

37 Claims, 7 Drawing Sheets

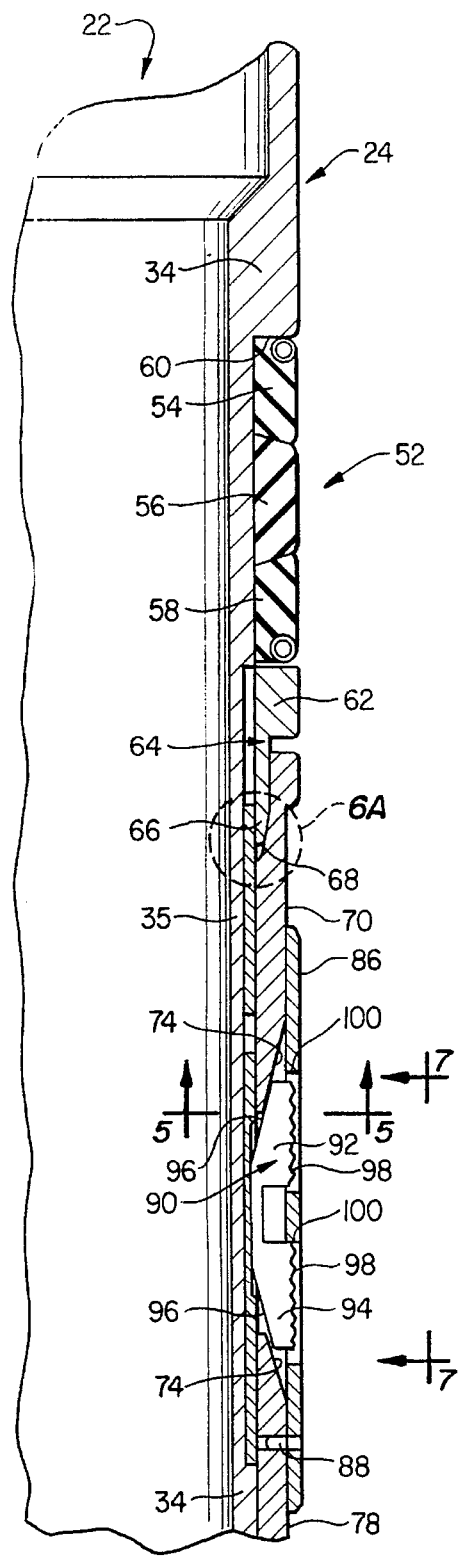
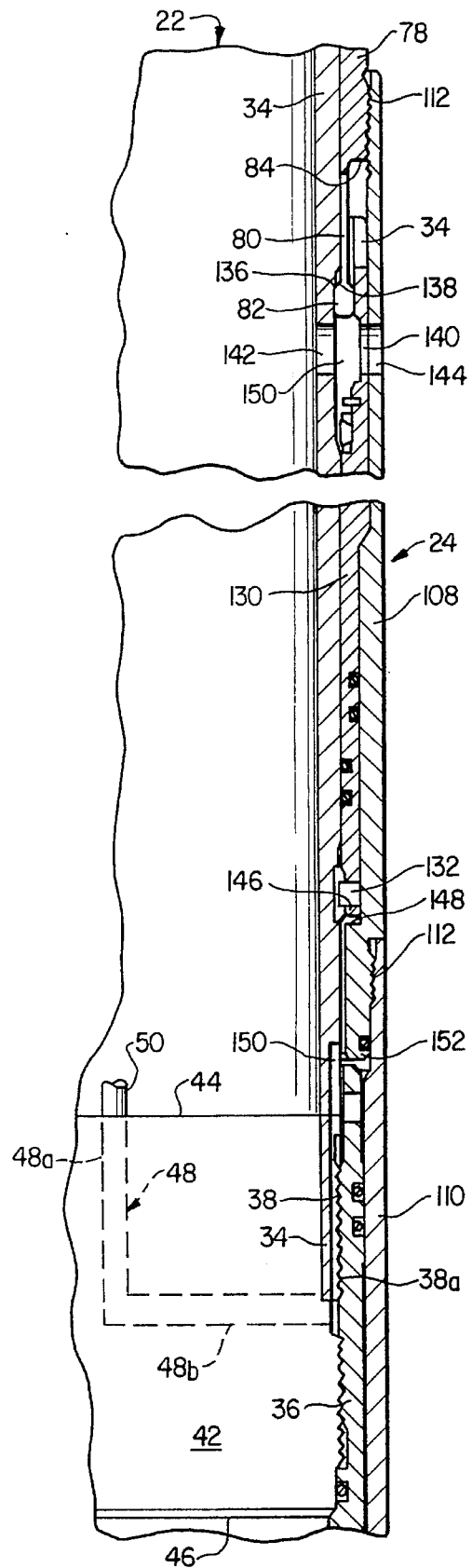
FIG. 2A
FIG. 2B

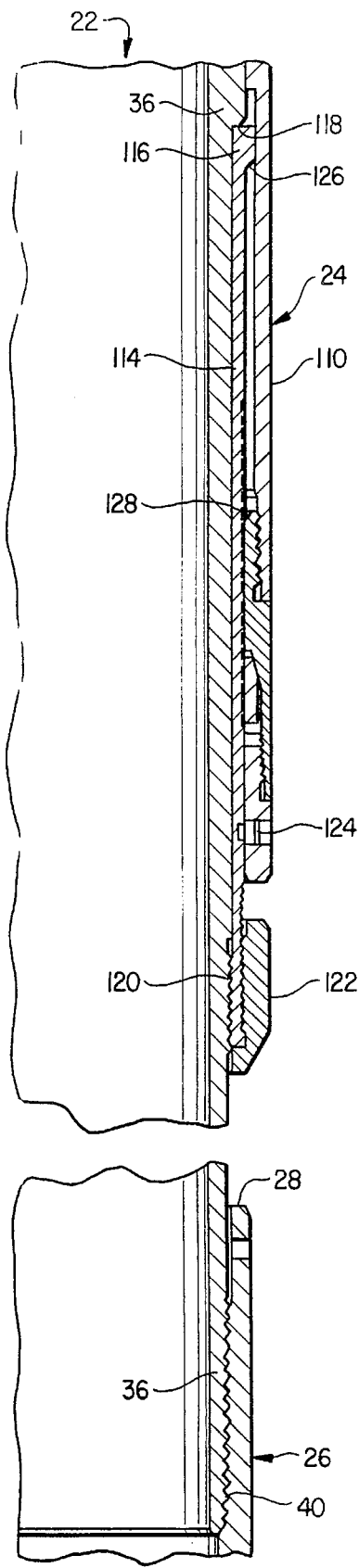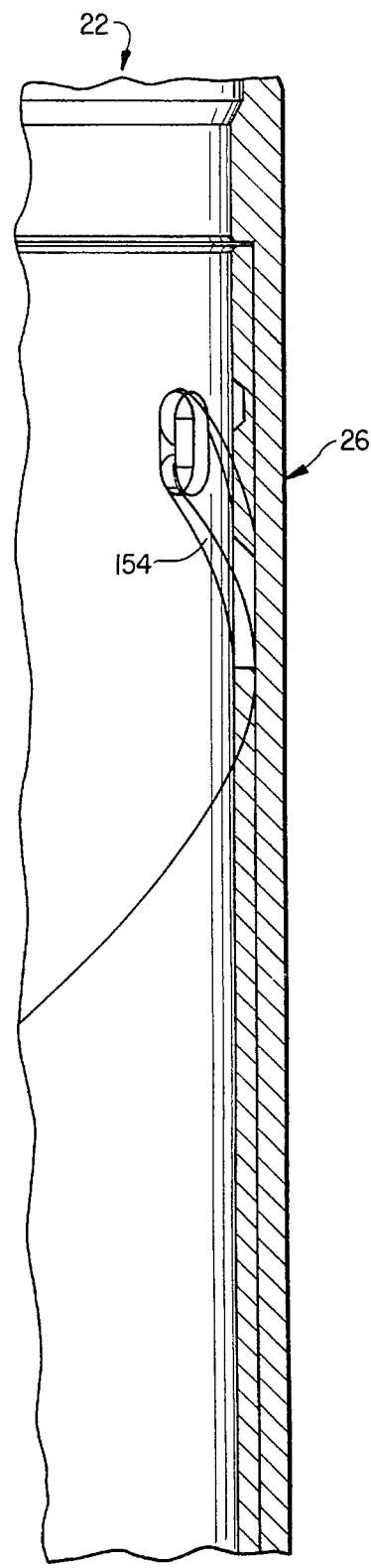
FIG. 2C
FIG. 2D

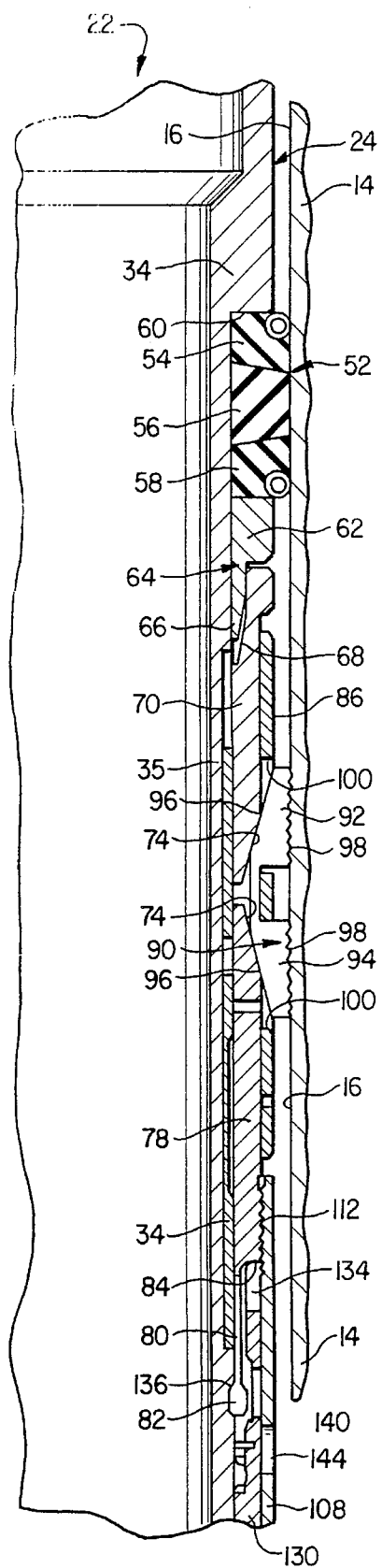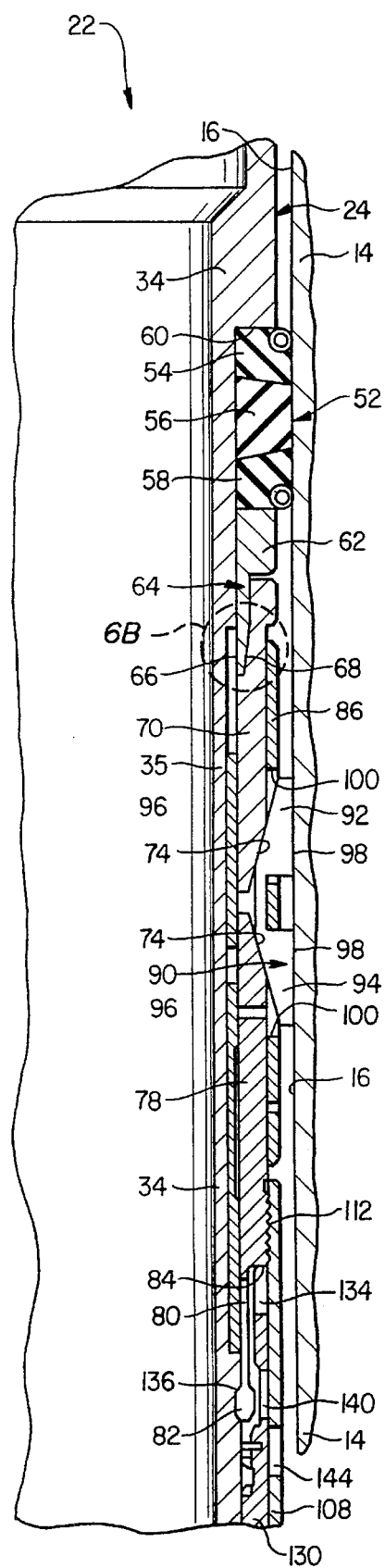
FIG. 3A
FIG. 4A

TORQUE-RESISTANT, SEAL SETTING FORCE-LIMITED, HYDRAULICALLY SETTABLE WELL PACKER STRUCTURE AND ASSOCIATED METHODS

CROSS-REFERENCE TO RELATED APPLICATION

This application is a continuation-in-part of copending U.S. application Ser. No. 08/296,941 filed on Aug. 26, 1994 and entitled "IMPROVED METHODS AND SYSTEMS FOR SUBTERRANEAN MULTILATERAL WELL DRILLING AND COMPLETION", such copending application being hereby incorporated in its entirety by reference herein.

BACKGROUND OF THE INVENTION

The present invention generally relates to well drilling and completion and, in a preferred embodiment thereof, more particularly relates to packer structures and associated methods utilized in well drilling and completion activities.

In a multilateral well formation method illustrated and described in the aforementioned copending U.S. application Ser. No. 08/296,941 incorporated herein by reference, a hydraulically settable tubular packer structure is operatively installed in a vertical well casing and coaxially supports an orienting nipple. The nipple has a key-receiving vertical locating profile formed on its interior side surface, and additionally has a spiral groove formed on its interior side surface.

After the packer/nipple structure is set in place within the casing, a diverter structure having a drillable core portion is lowered through the casing and passed downwardly through the packer/nipple structure interior. A locating key assembly carried by a lower end portion of the diverter structure snaps into place within the nipple vertical locating profile in a manner stopping further downward travel of the diverter structure and locking it to the nipple and locating the top end of the diverter structure above the top end of the packer/nipple structure at a predetermined vertical position within the well casing. As the diverter structure passes downwardly through the packer/nipple structure, and before the diverter locating key assembly snaps into locked engagement within the nipple vertical locating profile, a spring-loaded orienting lug disposed on the diverter structure enters and spirally traverses the nipple interior surface groove to thereby rotate the diverter structure to a predetermined circumferential orientation within the casing.

Using a sloped upper end face of the installed diverter as a deflecting surface, a suitable boring structure is then used to drill outwardly through the casing, and into the surrounding earth, to establish a lateral extension of the well bore. The newly formed lateral extension of the well is then provided with a concrete-encased lining structure that communicates it with the interior of the casing above the diverter structure. The diverter structure used to facilitate the formation of the lateral well extension blocks off the casing portion above the packer/nipple structure from the casing portion below the packer/nipple structure. In order to re-establish communication between these casing portions it is necessary to drill out the core of the diverter structure.

As will be appreciated, once the packer/nipple structure is set into place within the casing, in a precise vertical location and rotational orientation therein, it is critical to maintain both the vertical position and rotational orientation of the packer/nipple structure during the balance of the following lateral well extension formation procedure including the positioning of the diverter structure in the packer/nipple structure and its subsequent use as a boring tool deflection guide device.

Conventional packers which are mechanically or hydraulically set in place within a well flow conductor such as a casing string are respectively anchored and sealed within the conductor using circumferentially spaced, radially outwardly deflectable toothed metal slip anchors that are driven into biting engagement with the interior side surface of the casing, and an annular resilient seal structure that is axially compressed in a manner radially deforming it outwardly into sealing engagement with the interior side surface of the casing. These conventionally constructed packers are typically subjected primarily to axial loads within the casing, and their anchor structures, when properly set, work well to prevent axial shifting of the packer within the casing.

However, in the packer application just described, the set packer is subjected during various phases of the lateral well portion formation procedure to relatively high rotational forces within the casing, and conventional packer slip anchor structures do not tend to provide sufficient resistance to packer rotation within the casing, after the packer has been set, to prevent packer rotation relative to the casing in this particular packer application. Additionally, a potential problem with conventional packers of the type generally described above is the potential overstressing of their annular resilient seal assemblies during setting of the packer within the casing.

From the foregoing it can readily be seen that a need exists for improved packer apparatus, and associated methods, that eliminates or at least substantially reduces the foregoing anchoring and sealing problems, limitations and disadvantages which are typically associated with conventionally constructed packer assemblies. It is accordingly an object of the present invention to provide such improved packer apparatus and associated methods.

SUMMARY OF THE INVENTION

In carrying out principles of the present invention, in accordance with a preferred embodiment thereof, a packer structure is coaxially installable within a subterranean well flow conductor and is thereafter highly resistant to being rotated relative to the well flow conductor. The packer structure includes a tubular body coaxially positionable within the well flow conductor and having an axial centerline, and a circumferentially spaced plurality of slip anchors supported on the tubular body for radial movement relative thereto between inwardly retracted release positions and outwardly extended setting positions. Setting means are carried on the tubular body and are selectively operable to forcibly drive the slip anchors from their release positions to their extended positions in which toothed outer side surface portions of the slip anchors bitingly engage the interior side surface of the well flow conductor.

Preferably, a tubular orienting nipple is coaxially secured to a lower end portion of the tubular packer body portion and has an interior side surface portion in which a locating key profile and an axially spiraling groove are formed. Additionally, an annular resilient seal structure is coaxially carried on the tubular packer body portion and is axially compressed and radially outwardly deformed into sealing engagement with the interior side surface of the well flow conductor in response to the setting of the slip anchors.

According to one packer torque resisting feature of the invention, the gripping teeth on the outer sides of the slip anchors have lengths that are sloped relative to the axis of the packer body and relative to a plane perpendicular to the packer body axis. This specially designed gripping tooth arrangement and orientation provides the installed packer with a high degree of resistance to both axial and circumferential displacement relative to the well flow conductor. Preferably, each of the slip anchor outer side surfaces has upper and lower sections, with the gripping teeth on the upper and lower sections being sloped in generally opposite directions. Additionally, each circumferentially adjacent pair of upper sections have gripping teeth that are sloped in generally opposite directions.

According to another packer torque resisting feature of the invention, the slip anchors have sloped inner side surfaces that are engaged by circumferentially spaced flat areas formed on facing end portions of an opposed annular setting wedge members coaxially carried on the tubular packer body. These flat areas are circumferentially interdigitated with arcuate outer side surface portions of the facing wedge member ends that project farther out in radial directions than the flat areas.

When one of the wedge members is axially driven toward the other wedge member, the flat areas on the wedge members forcibly drive the slip anchors outwardly from their release positions to their setting positions. A subsequent rotational force imposed on the packer body and wedge members, which would otherwise tend to rotate the packer relative to the well flow conductor, is strongly resisted as the curved portions wedge member surface portions between the flat surface portions begin to move into an underlying relationship with the inner side surfaces of the slip anchors. As this occurs, the radially outwardly directed setting force on the anchors is increased, thereby increasing the resistance of the packer to rotational displacement relative to the well flow conductor.

According to another feature of the present invention, the packer is hydraulically settable in a two step procedure utilizing a drillable block member anchored within an interior portion of the tubular packer body in a sealing relationship therewith. A passage extends into the block through the top end thereof and then turns outwardly through the block and extends through an interior portion of a side wall section of the tubular packer body.

In the first setting step, a pressurized fluid is forced through the passage and responsively causes the setting of the slip anchors and a partial axial compression of the resilient seal structure. In the second setting step, a pressurized fluid is forced downwardly through the packer body interior and exerts a downwardly directed pressure force on the top end of the block. This, in turn, shifts the packer body downwardly relative to the setting wedges and completes the axial compression of the resilient seal structure. Finally, the block is drilled out to permit well fluid flow through the entire interior length of the packer.

According to a further feature of the present invention, during the second setting step, an annular structure coaxially carried by the tubular packer body forcibly engages one end of the seal structure and is axially deformable, to thereby limit the maximum axial compression force exerted on the seal structure, in response to the exertion thereon of an axial force exceeding a predetermined maximum level. Preferably, this axial deformation is provided by an annular setting force limiting member coaxially received in one of the setting wedge member, engageable with an end of the seal structure, and being wedgingly drivable axially into the setting wedge member.

BRIEF DESCRIPTION OF THE DRAWINGS

FIGS. 2A–2E are enlarged scale partial quarter sectional views through vertical portions of the packer structure that respectively correspond to vertical packer structure portions "A" through "E" in FIG. 1, with the packer structure being in an initial run-in configuration thereof;

FIGS. 3A–3C are enlarged scale partial quarter sectional views through vertical portions of the packer structure that respectively correspond to vertical packer structure portions "A" through "C" in FIG. 1, with the packer structure being in a partially set configuration thereof;

FIGS. 4A–4C are enlarged scale partial quarter sectional views through vertical portions of the packer structure that respectively correspond to vertical packer structure portions "A" through "C" in FIG. 1, with the packer structure being in a fully set configuration thereof;

DETAILED DESCRIPTION

Figure 1:
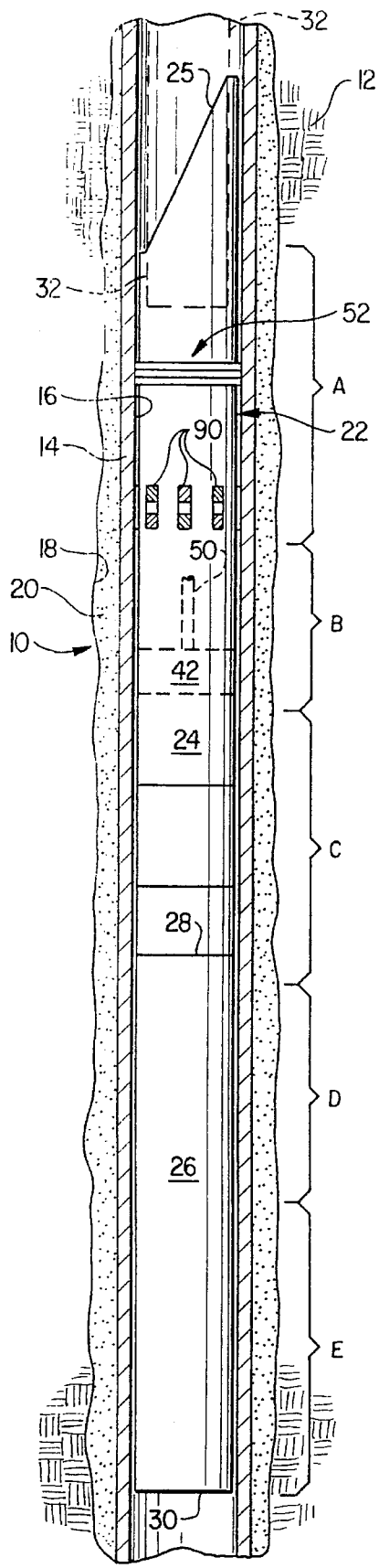
FIG. 1 is a highly schematic partly elevational cross-sectional view through a vertical portion of a subterranean well casing structure in which a hydraulically settable packer structure embodying principles of the present invention is operatively disposed.

Schematically illustrated in FIG. 1 is a vertical portion of a subterranean well 10 extending into the surrounding earth 12 and including a well flow conductor in the form of a metal casing string 14 having an interior side surface 16 and being set into a well bore 18 with a suitable cement lining material 20 circumscribing the casing 14. Representatively, the well 10 is an existing well which is to be augmented by the subsequent formation of at least one lateral well bore that extends generally horizontally outwardly from the casing 14 and communicates with its interior. This subsequent addition of a lateral well portion to the existing well 10 is illustrated and described in copending U.S. patent application Ser. No. 08/296,941 which has been incorporated herein by reference.

Still referring to FIG. 1, to facilitate this lateral extension of the well 10 the present invention provides a specially designed hydraulically settable packer structure 22 that is set in place within the casing 14, in a predetermined vertical location and rotational orientation therein, in a manner subsequently described. Packer structure 22 is of a hollow, open-ended tubular configuration and includes a tubular packer body assembly 24 having a sloping upper end 25, and a lower end portion coaxially anchored within an upper end portion of a tubular orienting nipple 26 having an upper end 28 and a lower end 30.

Before the packer structure 22 is set within the casing 14 it is lowered into the casing, to a predetermined depth therein, on a lower end portion of a tubular structure 32 that is coaxially secured within an upper end portion of the packer body assembly 24. The tubular structure 32 may representatively be the anchor latch structure illustrated and described in copending application Ser. No. 08/380,905 filed on 1/30/95 and entitled Decentralizing, Centralizing, Locating and Orienting Subsystems and Methods for Subterranean Multilateral Well Stilling and Completion (Docket No. OTIS - 940136U1P3) and, while being anchored to the upper end of the packer body assembly 24, permits a predetermined amount of relative axial movement between the tubular structure 32 and the packer body assembly 24 for purposes later described.

Structure of the Packer 22

Figure 2E:
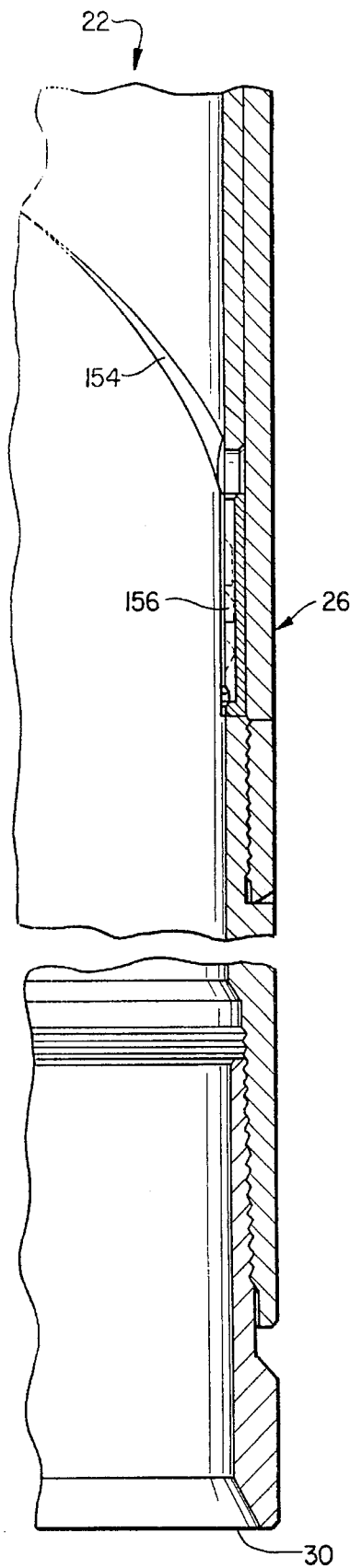

Referring now to FIGS. 2A–2E, which cross-sectionally illustrate the hydraulically settable packer structure 22 in its initial run-in orientation, the packer body assembly 24 includes upper and lower main tubular body portions 34,36 which are threaded together as at 38 (see FIG. 2B), with a lower end section of the lower main body portion 36 being threaded into the upper end of the orienting nipple 26 as at 40 (see FIG. 2C). For purposes later described, and according to a feature of the present invention, a generally cylindrical block 42 of drillable material (such as aluminum) having top and bottom ends 44 and 46 is suitably anchored coaxially within the interior of the packer body assembly 24 (see FIG. 2B), at the juncture between the upper and lower main body portions 34 and 36 and seals off the portion of the packer body interior above the block 42 from the portion of the packer body interior below the block 42.

An interior passage 48 is formed in the block 42 and has an axially extending portion 48a opening outwardly through the upper block end 44, and a radially extending portion 48b communicating with the inner end of the axial portion 48a and opening outwardly through the side of the block 42. A hydraulic hose 50 is connected at a lower end to the upper end of the passage portion 48a and extends upwardly therefrom to the surface via the interior of the packer 22.

Figure 6A:
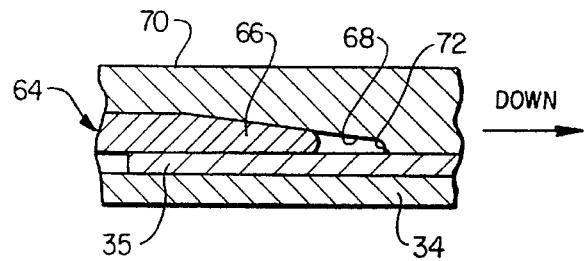
FIG. 6A is an enlarged scale cross-sectional detail view of the circled packer area "6A" in FIG. 2A, and illustrates a specially designed seal setting force-limiting structure in its run-in orientation.

Turning now to an upper end portion of FIG. 2A, a resilient seal assembly 52, comprising upper, intermediate and lower annular elastomeric seal members 54,56 and 58, coaxially circumscribes the upper main packer body portion 34 immediately below an annular, downwardly facing exterior ledge 60 thereon and above a radially thickened upper end portion 62 of an annular setting force limiting member 64 that represents another feature of the present invention. Member 64 slidably circumscribes a collar 35 extending around the packer body portion 34 and has an annular downwardly and radially inwardly tapered bottom end portion 66 (see FIG. 6A also). Bottom end portion 66 is slidably received in a similarly tapered annular interior side surface recess 68 formed in an upper end portion of an annular upper setting wedge member 70 that circumscribes the packer body portion 34 and is axially movable relative thereto. As best illustrated in FIG. 6A, the recess 68 has an annular stop surface 72 at its lower end.

Figure 5:
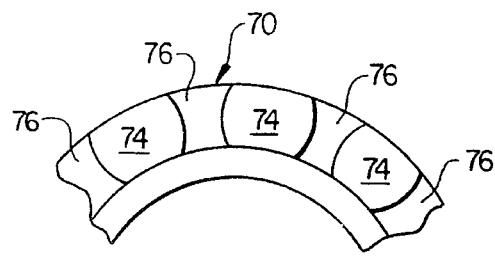
FIG. 5 is an enlarged scale bottom end elevational view, taken generally along line 5—5 of FIG. 2A, of a circumferential portion of an annular setting wedge member used in the packer structure and having a circumferentially spaced series of uniquely operative milled flat areas formed thereon.

The annular lower end of the setting wedge member 70 has a generally frustroconical shape, and, according to a feature of the present invention, is provided with a circumferentially spaced series of milled flat areas 74 (see FIG. 5) used for a purpose later described. As illustrated in FIG. 5, the milled flat areas 74 are interdigitated with a circumferentially spaced series of arcuate outer side surface portions 76 of the outer side surface of the lower end of the upper setting wedge member 70. Relative to the centerline of the setting wedge member 70, these arcuate outer side surface portions 76 project radially outwardly a greater distance than the flat areas 74.

Referring now to the lower end of FIG. 2A and the upper end of FIG. 2B, an annular lower setting wedge member 78 circumscribes the upper packer body member 34 and is downwardly spaced apart from the upper setting wedge member 70. Lower setting wedge member 78 has a tapered annular upper end portion which, like the lower end portion of the wedge member 70 (see FIG. 5) has a circumferentially spaced series of milled flat areas 74 disposed on its outer side surface and interdigitated with arcuate side surface portions 76. As can be seen near the top end of FIG. 2B, a circumferentially spaced series of collet fingers 80, having transversely enlarged lower end portions 82, depend from the annular bottom end surface 84 of the lower setting wedge member 78.

An annular slip carrier member 86 (see FIG. 2A) outwardly circumscribes facing end portions of the upper and lower setting wedge members 70 and 78 and is releasably secured to the lower setting wedge member 78 by shear pins 88, only one of which is visible in FIG. 2A. A circumferentially spaced series of metal slip anchors 90 are positioned between facing end portions of the upper and lower setting wedge members 70 and 78 and captively retained between the carrier member 86 and the upper packer body member 34 for radial movement relative thereto. Each slip anchor 90 has vertically spaced apart upper and lower end portions 92,94 that have tapered inner side surfaces 96 that are engaged in a ramp-like manner by the milled flats 74 on the opposing ends of the upper and lower setting wedge members 70 and 78, and toothed outer side surfaces 98, the tooth configurations of which represent another feature of the present invention. The end portions 92 and 94 of the slip anchors 90 are movable inwardly and outwardly through openings 100 in the slip carrier member 86.

Figure 7:
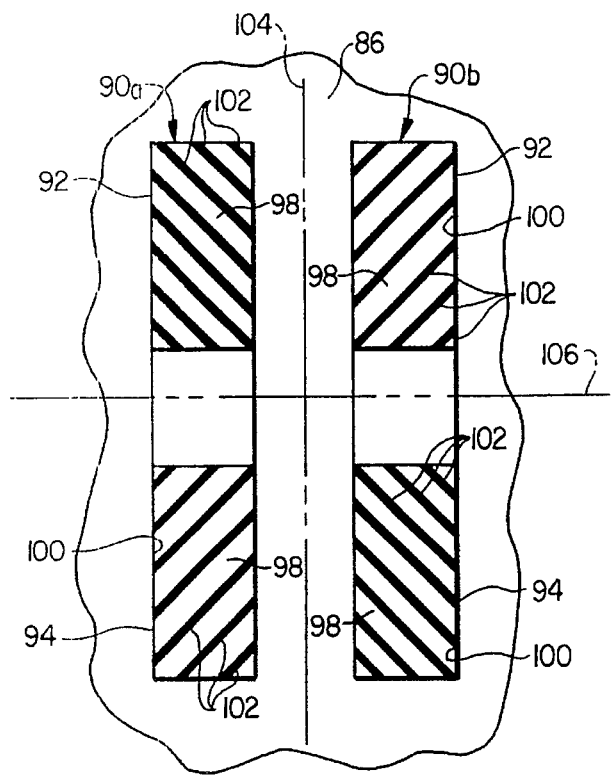
FIG. 7 is an enlarged, partially developed exterior side elevational view of a portion of the packer taken along line 7—7 of FIG. 2A and illustrating the specially configured toothed outer sides of a pair of slip anchor members operatively carried by the packer body.

A circumferentially adjacent pair 90a,90b of the specially designed slip anchors 90 are illustrated in FIG. 7 as view from their outer sides. For purposes later described, the lengths of the parallel gripping teeth 102 formed on the outer sides 98 of the slip anchor ends 92,94 do not extend transversely to the packer centerline 104 as is the case in conventionally configured slip anchor teeth. Instead, on each slip anchor 90 the lengths of the teeth 102 on its upper and lower end portions 92 and 94 are generally helically disposed relative to the length of the packer, with the lengths of the anchor teeth 102 being angled with respect to both the packer centerline 104 and a reference plane 106.

As illustrated in FIG. 7, for each of the representatively depicted slip anchors 90a,90b the lengths of the teeth 102 on its upper end portion 92 are angled oppositely from the lengths of the teeth 102 on its lower end portion 94. For example, on the slip anchor 90a the lengths of the teeth on the upper end portion 92 slope downwardly and to the right, while the lengths of the teeth on the lower end portion 94 slope downwardly and to the left as viewed in FIG. 7. Thus, the helical tooth patterns on the upper and lower end portions 92,94 of the slip anchor 90a are of opposite "hands". Additionally, as also illustrated in FIG. 7, the tooth patterns in each circumferentially adjacent upper slip anchor end portion 92 (for example, the upper end portions 92 of the slip anchors 90a,90b) are of opposite hands, and the tooth patterns in each circumferentially adjacent lower slip anchor end portion 94 (for example, the lower end portions 94 of the slip anchors 90a,90b) are also of opposite hands.

With reference now to FIGS. 2B and 2C, the packer body assembly 24 also includes a tubular piston structure that outwardly circumscribes the upper and lower main packer body portions 34,36 and comprises upper and lower tubular portions 108,110. The upper end of the tubular piston portion 108 outwardly circumscribes and is threaded onto the lower setting wedge member 78, as at 112 (see the upper end of FIG. 2B), just above the collet fingers 80. The lower end of the upper tubular portion 108 is threaded into the upper end of the lower tubular portion 110, as at 112, just above the drillable block 42 at the lower end of FIG. 2B.

A bottom end section of the lower tubular portion 110 (see FIG. 2C) outwardly circumscribes a tubular stop collar structure 114 which, in turn, outwardly circumscribes the lower main packer body portion 36. A radially enlarged upper annular end portion 116 of the stop collar structure 114 abuts an annular, downwardly facing ledge 118 formed on the lower packer body portion 36, and a lower end portion of the stop collar structure is threaded to the body portion 36, as at 120, and is radially outwardly enlarged, as at 122. The bottom end of the lower piston structure portion 110 is releasably anchored to the stop collar structure 114 by shear pins 124, only one of which is visible in FIG. 2C. An annular, downwardly facing stop surface 126 is formed on the upper stop collar end portion 116 and faces a corresponding upwardly facing annular stop surface 128 disposed on the inner side of the lower piston structure portion 110.

Returning now to FIG. 2B, a tubular latch member 130 is coaxially and captively retained between the upper packer body portion 34 and the upper piston structure portion 108 for sliding vertical movement relative thereto. The lower end of the latch member 130 is releasably anchored to the packer body portion 34 by shear pins 132, only one of which is visible in FIG. 2B. Axial notches 134 are circumferentially spaced around the upper end of the latch member 130, and just below the notches 134 the latch member 130 bears radially inwardly against the enlarged lower end portions 82 of the collet fingers 80. This holds sloping shoulder surfaces 136 on the finger portions 82 against a correspondingly sloped downwardly facing annular shoulder surface 138 on the packer body portion 34, thereby preventing upward movement of the lower setting wedge member 78 relative to the packer body portion 34.

Immediately below the collet finger portions 82 are a circumferentially spaced series of fluid bypass ports 140 formed in the latch member 130 and aligned with circumferentially spaced fluid bypass ports 142,144 respectively formed in the upper packer body portion 34 and the upper piston structure portion 108. The annular bottom end 146 of the latch member 130 is upwardly adjacent an upwardly facing annular interior ledge surface 148 on the upper piston structure portion 108.

Referring now to the bottom end of FIG. 2B, the outer end of the drillable block interior passage portion 48b communicates with an axially extending slotted portion 38a of the thread joint 38 which, in turn communicates with a lower end portion of an annular passage 150 disposed above the thread joint 38 and between the packer body member 34 and the piston structure outer wall portions 108,110. As illustrated in FIG. 2B, with the packer 22 in its run-in orientation the passage 150 is blocked above the upper end of the lower packer body portion 36 by the lower ends 146,152 of the latch member 130 and the upper piston structure portion 108, respectively.

Turning now to FIGS. 2D and 2E, extending downwardly along the interior side surface of the orienting nipple 26 is a spiraled groove 154 that terminates just above a key-receiving profile 156 (see FIG. 2E) also formed in the interior nipple side surface. After the packer 22 has been operatively set in the casing 14 in a manner subsequently described, a lower end portion of a diverter device may be lowered into the nipple 26 and locked into place therein as generally described in copending U.S. application Ser. No. 08/296,941 incorporated by reference herein.

Specifically, as illustrated and described in such copending application, the lower diverter device end may have a spring-loaded orienting lug that enters and rides along the groove 154 to rotationally orient the diverter device just before a locating key carried by the lower diverter device end snaps into place within the profile 156 to additionally position the diverter device in a precise predetermined vertical orientation within the casing 14.

Operation of the Packer 22

Figure 3B:
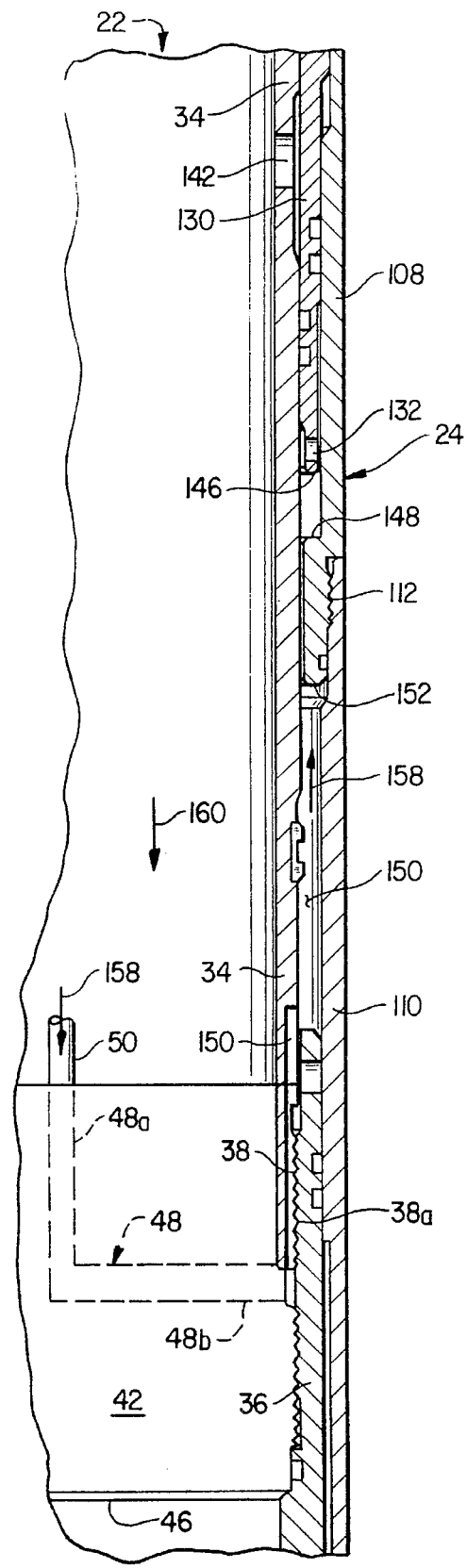
Figure 3C:
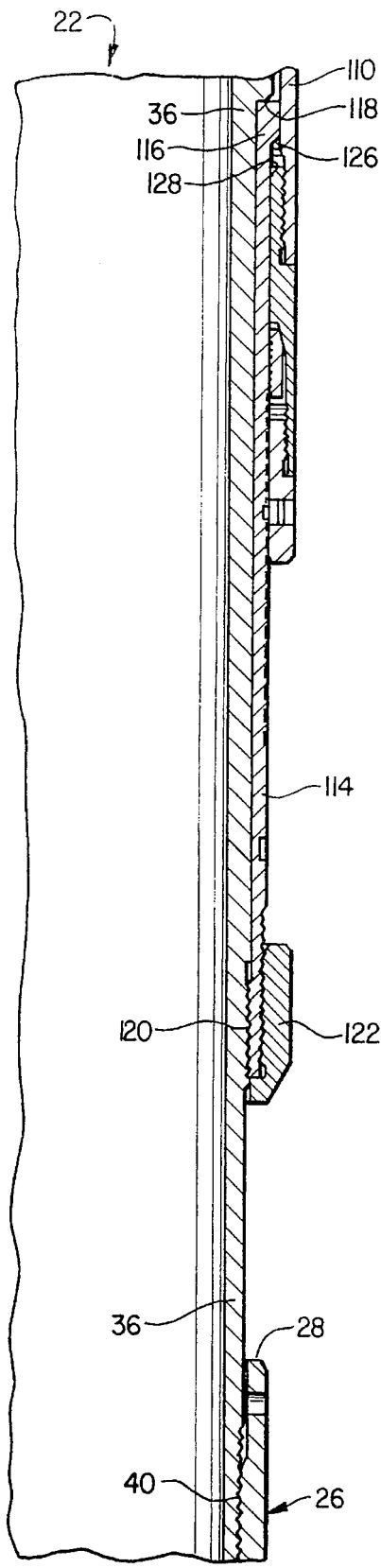
Figure 4C:
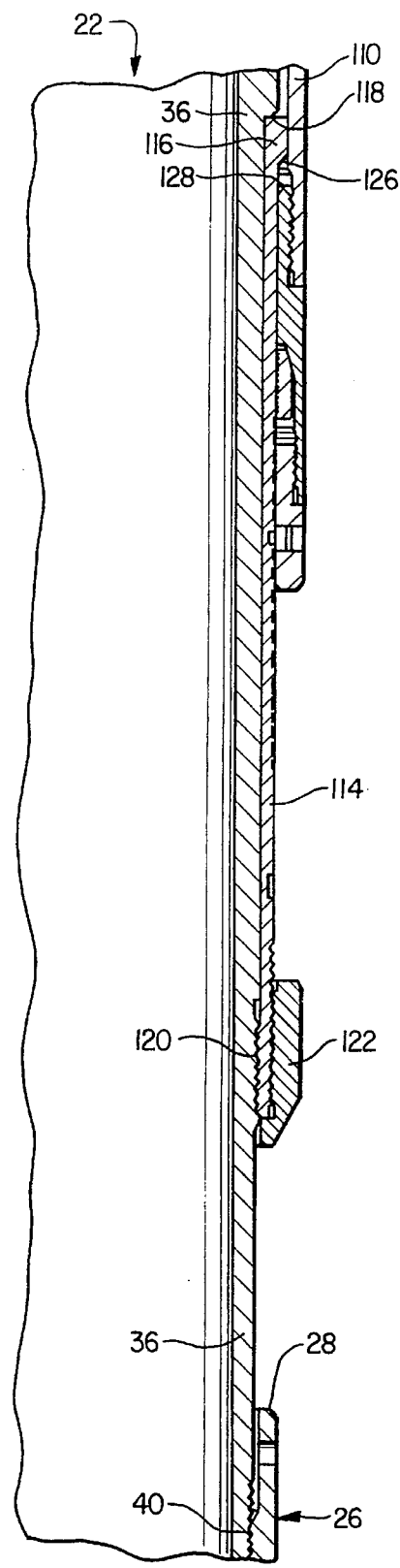

With the packer 22 in its run-in orientation just described in conjunction with FIGS. 2A–2E, the packer is lowered into the casing 14, on the lower end of the tubular anchor latch structure 32 (see FIG. 1), to a predetermined depth within the casing 14 as illustrated in FIG. 1. Referring now to FIGS. 3A–3C, the lowered packer 22 is then partially set within the casing 14 by forcing pressurized fluid 158 (see FIG. 3B) downwardly through the hydraulic hose 50. The pressurized fluid 158 enters the annular packer body chamber 150, via the drillable block passage 48 and the thread joint slot structure 38a and exerts an upwardly directed pressure force on the bottom ends 146,152 of the latch member 130 and the upper piston structure portion 108, respectively.

This upwardly directed fluid pressure force breaks the piston structure shear pins 124 (see FIG. 2C) and permits the threaded-together piston structure portions 108 and 110 to be hydraulically driven in an upward direction relative to the packer body portions 34,36 as may be seen by comparing FIGS. 2B and 2C to FIGS. 3B and 3C. The initial upward movement of the piston structure portions 108,110 permits the enlarged collet finger portions 82 (see FIG. 2B) to be radially outwardly deflected away from the annular shoulder surface 138 that previously blocked their upward movement, and causes the lower setting wedge member 78 to be hydraulically driven upwardly to its FIG. 3A position, thereby breaking the slip carrier shear pins 88 (see FIG. 2A).

Upwardly driven movement of the lower setting wedge member 78, in turn, causes the upper and lower setting wedge members 70,72 to radially outwardly ramp the slip anchors 90 into gripping engagement with the interior side surface 16 of the casing 14 as shown in FIG. 3A. The upwardly driven movement of the lower setting wedge member 78 also causes the upper setting wedge member 70 to be upwardly driven relative to the upper packer body portion 34 as may be seen by comparing FIG. 3A to FIG. 2A. This, in turn, drives the upper end portion 62 of the setting force limiting member 64 toward the annular ledge 60 on the upper packer body portion 34, thereby axially compressing the resilient seal assembly 52 and radially outwardly deforming it into sealing engagement with the interior side surface 16 of the casing 14. This partially sets the packer 22 within the casing 14.

Figure 4B:
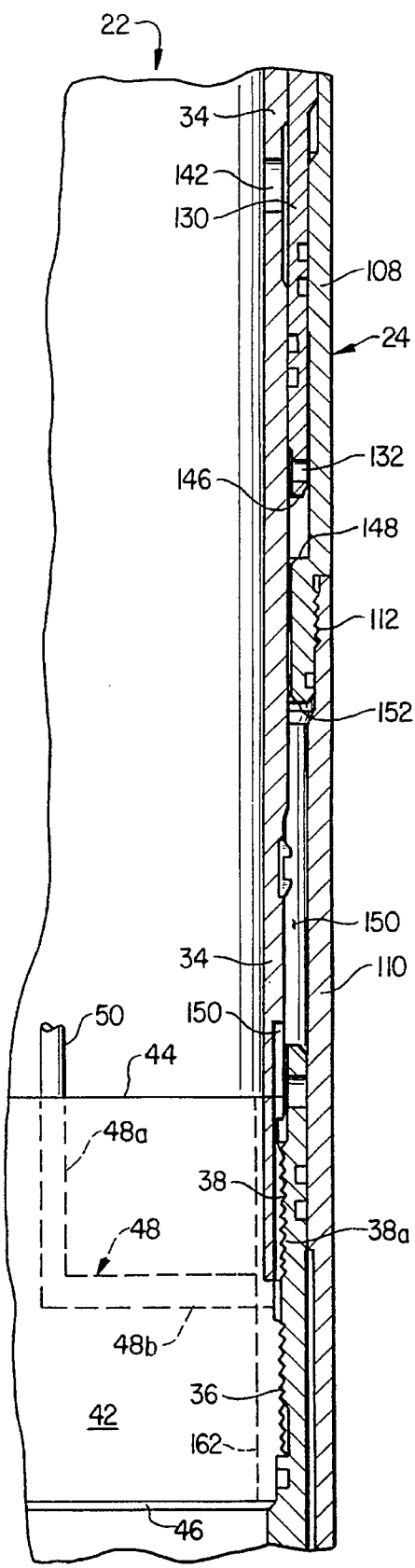

Next, the setting of the packer 22 within the casing 14 is completed by forcing a second pressurized fluid 160 downwardly through the packer interior (see FIG. 3B) externally of the hydraulic hose 50. The pressure of the fluid 160 on the top side of the drillable block 42 causes the interconnected main packer body portions 34,36 to downwardly shift relative to the tubular anchor latch structure 32 (see FIG. 1), and relative to the interconnected piston structure portions 108, 110 as may be seen by comparing FIGS. 3A–3C to FIGS. 4A–4C. This downward shifting of the main packer body portions 34 and 36, in turn, downwardly moves the packer body portion annular ledge 60 (see FIG. 4A) toward the upper end portion 62 of the setting force limiting member 64, thereby increasing the axial compression force on the seal structure 52 and increasing its radial sealing force against the interior side surface 16 of the casing 14.

Figure 6B:
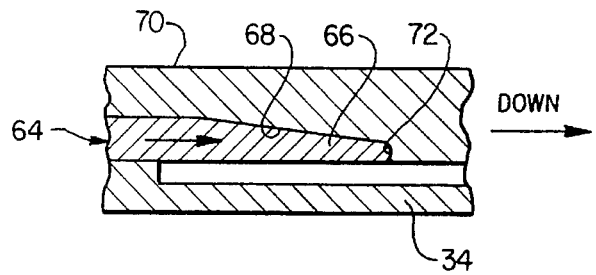
FIG. 6B is an enlarged scale cross-sectional detail view of the circled packer area "6B" in FIG. 4A, and illustrates the seal setting force-limiting structure after the packer has been brought to its fully set orientation.

According to a feature of the present invention, this additional axial compression of the resilient seal structure 52 (and thus the potential for overcompressing it) is limited by the setting force limiting member 64 which is downwardly driven from its FIG. 6A position toward its FIG. 6B position in which the force limiting member lower end 66 wedges against the upper setting wedge member 70 and bottoms out against the recess stop surface 72. This limited degree of axial "slip" between the setting force limiting member 64 and the interior setting wedge member side surface portion against which it wedges advantageously protects the resilient seal structure 52 from overcompression during the final packer setting procedure just described. After the setting of the packer 22 has been completed, the block 42 is suitably drilled out, as indicated by the dotted line 162 in FIG. 4B, to establish flow communication between the interior portions of the packer 22 above and below the block location.

As previously mentioned herein, a key advantage of the installed packer 22 is that, unlike conventional packers utilizing toothed slip anchor structures, it is highly resistant to rotational displacement relative to the casing 14 caused by torque imposed on the packer 22 during subsequent completion operations, such as the formation of lateral extensions of the well 10 as illustrated and described in copending U.S. application Ser. No. 08/296,941 incorporated by reference herein.

This greatly enhanced resistance to rotational shifting relative to the casing 14 is uniquely provided in the present invention by (1) the previously described flat areas 74 formed on the facing annular ends of the upper and lower setting wedge members 70 and 78 (see FIG. 5), and (2) the spirally patterned gripping teeth 102 formed on the slip anchors 90 (see FIG. 7).

Relative to the flat areas 74 on the setting wedge members 70 and 78, against which the sloping inner side surfaces 96 of the slip anchors 90 bear as shown in FIG. 4A, it can be seen that an attempted rotation of the packer body relative to the outwardly ramped slip anchors 90 which grip the interior side surface 16 of the casing 14 would tend to rotate the flat areas 74 circumferentially away from their radially outwardly overlying inner side surfaces 96 of the slip anchors 90. However, any such relative rotation of the setting wedge members 70,78 relative to the anchors is very strongly resisted by the arcuate setting wedge surface areas 76 (see FIG. 5) disposed between the flat areas 74 which, as previously mentioned, project radially outwardly beyond the flat areas 74. Because of this, in order for the arcuate wedge member surface areas 76 to be rotated to underlying relationships with the slip anchor side surfaces 96 a very high pressure interference fit would have to be created between the wedge and anchor surfaces 76 and 96. This, of course, is strongly resisted by the already high radial contact forces between the slip anchors 90 and the casing 14. Accordingly, the flat setting wedge surfaces 74 and the anchor side surfaces 96 uniquely cooperate to very strongly inhibit rotation of the installed packer 22 relative to the casing 14.

This anti-rotation feature of the packer 22 is greatly augmented by the previously described gripping tooth profiles of the slip anchors 90. Due to fact that the slip anchor gripping teeth 102 (see FIG. 7) are sloped relative to both the centerline 104 and the perpendicular plane 106, they strongly resist both axial and circumferential displacement of the packer 22 relative to the casing 14.

As previously mentioned in conjunction with FIG. 7, in accordance with a preferred embodiment of the slip anchors 90, the spiral tooth pattern on the upper end portion 92 of each slip anchor is of a generally opposite hand than the spiral tooth pattern on the lower end portion 94 of the slip anchor. Additionally, the spiral tooth pattern hand on each circumferentially successive upper end portion 92 is opposite that of the circumferentially preceding upper end portion 92, and the spiral tooth pattern hand on each circumferentially successive lower end portion 94 is opposite that of the circumferentially preceding lower end portion 94.

This alternating axial and circumferential spiral tooth pattern hand reversal facilitates the rotational resistance of the packer regardless of the sense of the rotational force imposed on the installed packer relative to its centerline 104. It can be seen that if all of the anchor teeth 102 sloped in the same direction, this would still resist rotational packer movement better than conventional slip anchor teeth which are typically transverse to the packer centerline. However, with all of the teeth in the same direction, the rotational resistance would be greater in response to rotational force imposed on the packer in a first direction than in the opposite direction since, in the first direction, the teeth could at least theoretically be forced to "thread into" the casing. With the tooth profile relationships shown in FIG. 7, though, the rotational resistance of the packer 22 is at a substantially equal high level regardless of the direction of rotational force imposed on the packer about its centerline.

While the illustrated packer structure 22 is particularly well adapted for use in multilateral well formation as illustrated and described in copending U.S. application Ser. No. 08/296,941 it will readily be appreciated by those of skill in this particular art that it can be utilized to advantage in other applications as well. Additionally, while the illustrated packer 22 has been illustrated as being of a hydraulically settable configuration, it will be readily appreciated by those of skill in this particular art that various of its unique structural and operational features may be advantageously incorporated in mechanically settable packer structures as well.

The foregoing detailed description is to be clearly understood as being given by way of illustration and example only, the spirit and scope of the present invention being limited solely by the appended claims.

What is claimed is:

1. Torque-resistant well packer apparatus comprising:

a tubular body coaxially positionable within a subterranean well flow conductor and having an axial centerline;

a circumferentially spaced plurality of slip anchors supported on said tubular body for radial movement relative thereto between inwardly retracted release positions and outwardly extended setting positions, each of said slip anchors having an outer side surface portion with a spaced series of parallel gripping teeth formed thereon, said teeth being generally helically disposed relative to said centerline, said teeth further having lengths that are sloped relative to said centerline and relative to a plane perpendicular to said centerline; and setting means carried on said tubular body and being selectively operable to forcibly drive said slip anchors from said release positions thereof to said setting positions thereof.

2. The torque-resistant well packer apparatus of claim 1 wherein:

said setting means are hydraulically operable.

3. The torque-resistant well packer apparatus of claim 1 wherein:

said tubular body has upper and lower ends, and each of said slip anchors outer side surface portions has upper and lower sections, with the gripping teeth on said upper and lower sections being sloped in generally opposite directions.

4. The torque-resistant well packer apparatus of claim 3 wherein:

the gripping teeth on each circumferentially adjacent pair of said upper sections are sloped in generally opposite directions.

5. The torque-resistant well packer apparatus of claim 4 wherein:

all of said gripping teeth generally spiral about said centerline.

6. The torque-resistant well packer apparatus of claim 1 wherein:

said tubular body has a lower end portion, and said torque-resistant well packer apparatus further comprises a tubular orienting nipple coaxially secured to said lower end portion and axially extending downwardly therefrom, said orienting nipple having an interior surface portion in which a locating key profile and an axially spiraling groove are formed.

7. Torque-resistant well packer apparatus comprising:

a tubular body coaxially positionable within a subterranean well flow conductor and having an axial centerline;

a circumferentially spaced plurality of slip anchors supported on said tubular body for radial movement relative thereto between inwardly retracted release positions and outwardly extended setting positions; and setting means movably carried on said tubular body and engaging said slip anchors, said setting means being operative to (1) forcibly drive said slip anchors from said release positions thereof to said setting positions thereof in response to axial movement of said setting means relative to said tubular body, and (2) exert a radially outwardly directed force on said slip anchors in response to an attempted rotation about said centerline of said tubular body and said setting means relative to said slip anchors.

8. The torque-resistant well packer apparatus of claim 7 wherein:

said slip anchors have sloping radially inner side surface portions, and said setting means include first and second annular wedge members slidably carried on said tubular body and having facing annular ends, said facing annular ends having radially outer side surfaces with circumferentially spaced apart sloping flat areas formed thereon and engaging said radially inner side surface portions of said slip anchors in ramp-like manners, said sloping flat areas on each of said annular ends being circumferentially interdigitated with a series of arcuate outer side surface portions projecting radially outwardly beyond the flat areas.

9. The torque-resistant well packer apparatus of claim 8 wherein:

said facing annular ends are tapered radially inwardly and axially toward one another.

10. The torque-resistant well packer apparatus of claim 7 wherein:

said tubular body has a lower end portion, and said torque-resistant well packer apparatus further comprises a tubular orienting nipple coaxially secured to said lower end portion and axially extending downwardly therefrom, said orienting nipple having an interior surface portion in which a locating key profile and an axially spiraling groove are formed.

11. Well packer apparatus comprising:

a tubular body structure coaxially positionable within a subterranean well flow conductor and having an axial centerline, said tubular body structure including telescoped first and second tubular portions axially movable toward one another and having facing annular surfaces forming with an annular outer side surface section of one of said first and second tubular portions an annular recess on said tubular body structure;

an annular resilient seal structure coaxially received in said annular recess;

setting means operable to force one of said first and second tubular portions toward the other of said first and second tubular portions, through a predetermined setting distance, to thereby exert an axial setting force on said annular resilient seal structure in a manner axially compressing and radially outwardly deforming it; and means for permitting one of said first and second tubular portions to be axially deformed, during axial compression of said resilient seal structure, in a manner limiting the axial setting force exertable on said resilient seal structure by said first and second tubular portions.

12. The well packer apparatus of claim 11 wherein:

said one of said first and second tubular portions includes:

an annular force limiting member having a body portion with a radially enlarged first end portion facing the other of said first and second tubular portions and defining said annular surface of said one of said first and second tubular portions, and a second end portion, and an annular drivable member drivable by said setting means toward the annular surface of the other of said first and second tubular members and having a first end portion telescopingly receiving said second end portion of said force limiting member body portion, said second end portion of said force limiting member being wedgingly drivable further into said drivable member in 14 response to a predetermined axial compression force exerted on said resilient seal structure by said first and second tubular portions.

13. The well packer apparatus of claim 12 wherein:

said annular drivable member has an annular interior shoulder surface facing said force limiting member and operative to be engaged by said force limiting member in a manner limiting the movement of said force limiting member into said drivable member.

14. The well packer apparatus of claim 11 wherein:

said setting means are hydraulically operable.

15. The well packer apparatus of claim 12 wherein:

said annular drivable member is a slip anchor - setting wedge member.

16. The well packer apparatus of claim 11 wherein:

said tubular body structure has a lower end portion, and said well packer apparatus further comprises a tubular orienting nipple coaxially secured to said lower end portion and axially extending downwardly therefrom, said orienting nipple having an interior surface portion in which a locating key profile and an axially spiraling groove are formed.

17. Torque-resistant well packer apparatus comprising:

a tubular body structure coaxially positionable within a subterranean well flow conductor and having an axial centerline;

an annular resilient seal structure coaxially carried on said tubular body structure;

a circumferentially spaced plurality of slip anchors supported on said tubular body structure for radial movement relative thereto between inwardly retracted release positions and outwardly extending setting positions;

setting means movably carried on said tubular body structure and engaging said slip anchors, said setting means being operative to (1) forcibly drive said slip anchors from said release positions thereof to said setting positions thereof in response to axial movement of said setting means relative to said tubular body structure, (2) exert a radially outwardly directed force on said slip anchors in response to an attempted rotation about said centerline of said tubular body structure and said setting means relative to said slip anchors, and (3) axially compress and radially outwardly deform said resilient seal structure; and force limiting means associated with said setting means for limiting the axial compression force exertable on said resilient seal structure created by operation of said setting means.

18. The torque-resistant well packer apparatus of claim 17 wherein:

said setting means are hydraulically operable.

19. The torque-resistant well packer apparatus of claim 18 wherein:

said tubular body structure has a side wall portion with an interior flow passage therein, said torque-resistant well packer apparatus further comprises a drillable block member sealingly disposed in and blocking an interior portion of said tubular body structure, said drillable block member having a passage therein through which pressurized fluid may be flowed into said side wall portion passage of said tubular body structure, and said setting means are operative in a first stage to forcibly drive said slip anchors from said release positions thereof to said setting positions thereof and to axially compress and radially outwardly deform said resilient seal structure in response to flowing pressurized fluid into said side wall portion passage of said tubular body structure.

20. The torque-resistant well packer apparatus of claim 19 wherein:

said drillable block member has an upper end surface and is anchored within a first tubular portion of said tubular body structure which is telescopingly received within a second tubular portion of said tubular body structure for axial movement relative thereto in response to a downwardly directed fluid pressure force exerted on said upper end surface of said drillable block member, said setting means are operative in a second stage to further axially compress said resilient seal structure in response to fluid-forced relative axial movement between said first and second tubular portions of said tubular body structure.

21. The torque-resistant well packer apparatus of claim 17 wherein:

said tubular body structure has a lower end portion, and said torque-resistant well packer apparatus further comprises a tubular orienting nipple coaxially secured to said lower end portion and axially extending downwardly therefrom, said orienting nipple having an interior surface portion in which a locating key profile and an axially spiraling groove are formed.

22. The torque-resistant well packer apparatus of claim 17 wherein:

said tubular body structure has upper and lower ends, and each of said slip anchors outer side surface portions has upper and lower sections, with the gripping teeth on said upper and lower sections being sloped in generally opposite directions.

23. The torque-resistant well packer apparatus of claim 22 wherein:

the gripping teeth on each circumferentially adjacent pair of said upper sections are sloped in generally opposite directions.

24. The torque-resistant well packer apparatus of claim 23 wherein:

all of said gripping teeth generally spiral about said centerline.

25. The torque-resistant well packer apparatus of claim 17 wherein:

said slip anchors have sloping radially inner side surface portions, and said setting means include first and second annular wedge members slidably carried on said tubular body structure and having facing annular ends, said facing annular ends having radially outer side surfaces with circumferentially spaced apart sloping flat areas formed thereon and engaging said radially inner side surface portions of said slip anchors in ramp-like manners, said sloping flat areas on each of said annular ends being circumferentially interdigitated with a series of arcuate outer side surface portions projecting radially outwardly beyond the flat areas.

26. The torque-resistant well packer apparatus of claim 25 wherein:

said facing annular ends are tapered radially inwardly and axially toward one another.

27. The torque-resistant well packer apparatus of claim 17 wherein:

said tubular body structure includes telescoped first and second tubular portions axially movable toward one another and having facing annular surfaces forming with an annular outer side surface section of one of said first and second tubular portions an annular recess on said tubular body structure, said annular resilient seal structure is coaxially received in said annular recess, said setting means are operable to force one of said first and second tubular portions toward the other of said first and second tubular portions, through a predetermined setting distance, to thereby exert an axial setting force on said annular resilient seal structure to axially compress and radially outwardly deform it, and said force limiting means are operative to permit one of said first and second tubular portions to be axially deformed, during axial compression of said resilient seal structure, in a manner limiting the axial setting force exertable on said resilient seal structure by said first and second tubular portions.

28. The torque-resistant well packer apparatus of claim 27 wherein:

said one of said first and second tubular portions includes:
an annular force limiting member having a body portion with a radially enlarged first end portion facing the other of said first and second tubular portions and defining said annular surface of said one of said first and second tubular portions, and a second end portion, and an annular drivable member drivable by said setting means toward the annular surface of the other of said first and second tubular members and having a first end portion telescopingly receiving said second end portion of said force limiting member body portion, said second end portion of said force limiting member being wedgingly drivable further into said drivable member in response to a predetermined axial compression force exerted on said resilient seal structure by said first and second tubular portions.

29. The torque-resistant well packer apparatus of claim 28 wherein:

said annular drivable member has an annular interior shoulder surface facing said force limiting member and operative to be engaged by said force limiting member in a manner limiting the movement of said force limiting member into said drivable member.

30. The torque-resistant well packer apparatus of claim 28 wherein:

said annular drivable member is a slip anchor - setting wedge member.

31. A method of installing a packer in a subterranean well flow conductor having an interior side surface, said method comprising the steps of:

providing a packer having a tubular body longitudinally extending along an axis, a spaced plurality of slip anchors carried on said tubular body for radial movement relative thereto between inwardly retracted and outwardly extended positions and having outer side surfaces with gripping teeth, said teeth being generally helically disposed relative to said centerline, said teeth further having lengths sloped relative to said axis and a plane traverse thereto;

coaxially positioning said packer within the well flow conductor with said slip anchors in their retracted positions; and setting said packer within the well flow conductor by forcibly moving said slip anchors from their retracted positions to their extended positions to drive said gripping teeth into biting engagement with the interior side surface of the well flow conductor.

32. The method of claim 31 wherein:

said packer further has an annular resilient seal structure coaxially circumscribing said tubular body, and said setting step further includes axially compressing said resilient seal structure, and radially deforming it outwardly into sealing engagement with the interior side surface of the well flow conductor, in response to forcibly moving said slip anchors from their retracted positions to their extended positions.

33. A method of installing a packer in a subterranean well flow conductor, said method comprising the steps of:

providing a packer having a tubular body portion longitudinally extending along an axis, a circumferentially spaced plurality of slip anchors captively retained on said body portion for radial movement relative thereto between inwardly retracted positions and outwardly extended positions, said slip anchors having sloping inner side surface portions and toothed outer side surface portions, an axially spaced pair of annular setting wedge members coaxially carried on said body portion and having facing end portions with annular outer side surfaces in which circumferentially spaced series of flattened areas are formed, said flattened areas facing and engaging said sloping inner side surface portions of said slip anchors;

coaxially positioning said tubular body portion within the well flow conductor with said slip anchors in their retracted positions; and setting said packer within the well flow conductor by axially forcing one of said setting wedge members toward the other setting wedge member to forcibly drive said slip anchors outwardly from their retracted positions to their extended positions and cause said toothed outer side portions of said slip anchors to bitingly engage the interior side surface of the well flow conductor.

34. The method of claim 33 wherein:

said packer further has an annular resilient seal structure coaxially circumscribing said tubular body, and said setting step further includes axially compressing said resilient seal structure, and radially deforming it outwardly into sealing engagement with the interior side surface of the well flow conductor, in response to axially forcing said one of said setting wedge members toward the other setting wedge member.

35. A method of installing a packer in a subterranean well flow conductor, said method comprising the steps of:

providing a packer having a tubular body portion longitudinally extending along an axis, a spaced plurality of slip anchors carried on said tubular body for radial movement relative thereto between inwardly retracted and outwardly extended positions and having toothed outer side surfaces, an annular resilient seal structure coaxially carried exteriorly on said tubular body portion, a drillable block member disposed within, anchored to, and sealing off an interior portion of said tubular body, and a hydraulic flow passage having a first portion extending through said drillable block member, and a second portion extending through the interior of a side wall section of said tubular body portion 14 and communicating with said first portion;

coaxially positioning said packer within the well flow conductor with said slip anchors in their retracted positions;

flowing a pressurized fluid sequentially through said first and second hydraulic flow passage portions and responsively forcing said slip anchors from their retracted positions to their extended positions to drive their toothed outer side surfaces into biting engagement with the interior side surface of the well flow conductor, and axially compressing and radially deforming said resilient seal structure outwardly into engagement with the interior side surface of the well flow conductor;

flowing a pressurized fluid through the interior of said tubular body and externally into forcible engagement with said drillable block member in a manner responsively causing an axial shifting of said tubular body relative to said slip anchors and the further axial compression of said resilient seal structure.

36. The method of claim 35 wherein:

said packer has an annular structure coaxially carried on said tubular body portion and having an end portion forcibly engaging an end of said annular resilient sealing structure during said axial shifting of said tubular body relative to said slip anchors, and said method further comprises the step of limiting the further axial compression of said resilient seal structure by permitting said annular structure to axially deform in response to an axial force exerted thereon by said resilient sealing structure and exceeding a maximum predetermined axial force.

37. The method of claim 35 further comprising the step of drilling out said drillable block member after the performance of said flowing steps.

* * * * *